United States Patent
Souwapawong

(10) Patent No.: US 7,484,846 B2
(45) Date of Patent: Feb. 3, 2009

(54) DOUBLE EYELID FORMING DEVICES

(76) Inventor: Reka Souwapawong, 4 Martine Ave., PH 119, White Plains, NY (US) 10606

( * ) Notice: Subject to any disclaimer, the term of this patent is extended or adjusted under 35 U.S.C. 154(b) by 91 days.

(21) Appl. No.: 11/715,122

(22) Filed: Mar. 8, 2007

(65) Prior Publication Data

US 2007/0216858 A1 Sep. 20, 2007

Related U.S. Application Data

(60) Provisional application No. 60/780,494, filed on Mar. 9, 2006.

(51) Int. Cl.
*G02C 1/00* (2006.01)
(52) U.S. Cl. ......................... 351/158; 351/41
(58) Field of Classification Search .................. 351/41, 351/158, 51, 52, 156, 157
See application file for complete search history.

(56) References Cited

U.S. PATENT DOCUMENTS 4,153,346 A * 5/1979 Gomer ........................ 351/52

6,733,856 B2 5/2004 Nojiri
2004/0134506 A1 7/2004 Nojiri

FOREIGN PATENT DOCUMENTS

| CN | 2044817 U | 9/1989 |
|---|---|---|
| JP | 2003-310650 | 11/2003 |
| KR | 2003069056 | * 8/2003 |

* cited by examiner

*Primary Examiner*—Hung X Dang
(74) *Attorney, Agent, or Firm*—Evelyn M. Sommer; Zhiqiang Liu

(57) ABSTRACT

A double eyelid forming device for non-surgically generating a crease in the upper eyelids of a human comprising a pair of glasses, one string attached to each of the two upper rims of the glasses and running along the curvature of the upper rim, and two sets of beads, each set slidably threaded onto one string. When the device is worn by a human, each set of the beads presses against the corresponding upper eyelid of the human and lead to the formation of a double eyelid.

10 Claims, 2 Drawing Sheets

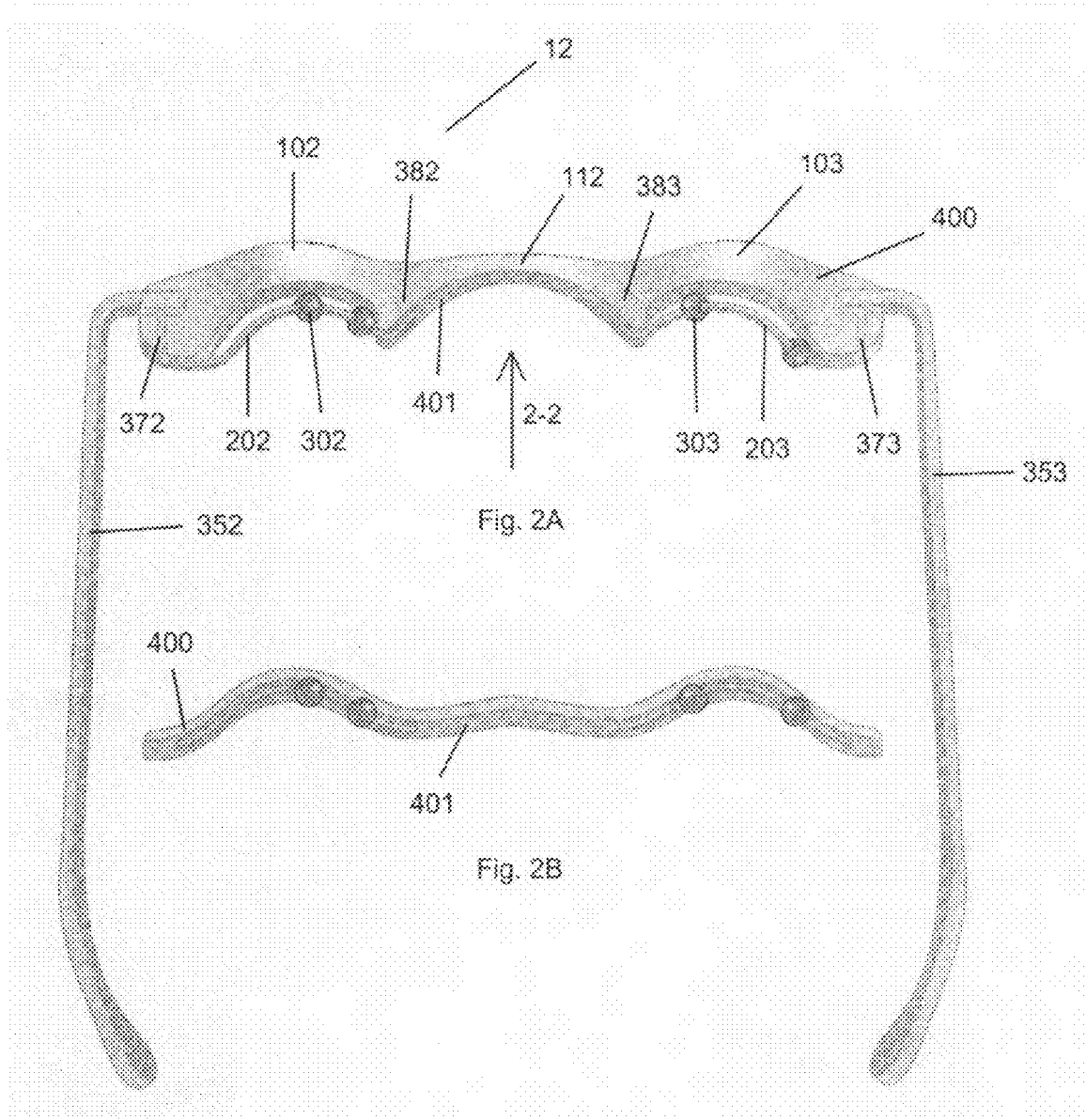

DOUBLE EYELID FORMING DEVICES

The present invention claims the priority of the provisional application Ser. No. 60/780,494 filed Mar. 9, 2006.

BACKGROUND OF THE INVENTION

People in certain populations, for example as much as about 50% Asian populations, are born with single eyelids, i.e., an upper eyelid without visible crease. There has always existed an aesthetic need for converting single eyelids into double eyelids, i.e., upper eyelid divided into a top and bottom portion by a visible crease. The most prevalent manner of conversion is surgery, which is costly, painful and risky. There is a genuine need for non-surgical methods for converting single eyelids into double eyelids.

U.S. Pat. No. 6,733,856 and U.S. Patent Appl. Pub. No. 2004/0134506 disclose tapes or strings for attaching to the eyelids to form a fold thereon.

Japanese Pat. Pub. No. JP2003310650 discloses a linear and flexible apparatus generally in the shape of eyeglasses. When worn, the upper rim is pressed into the upper eyelids of the wearer and creates a crease therein.

Chinese Pat. Pub. No. CN2044817U discloses an apparatus comprising frame and two pins. The end of the pins are pressed into the eyelids of the wearer, generating point depressions. By sliding the pins along the length of the frame, a line of depression, i.e., a crease can be made into the eyelids of the wearer.

One object of the present invention is to provide a device which can be worn by the wearer without any assistance to generate a crease in the upper eyelids in a non-surgical manner.

Another object of the present invention is to provide a device in the form of fully functional eyeglasses which can be worn by the wearer without any assistance to generate a crease in the upper eyelids in a non-surgical manner.

A further object of the present invention is to provide a kit for converting a set of regular eyeglasses into a device that can be worn by the wearer without any assistance to generate a crease in the upper eyelids in a non-surgical manner.

BRIEF DESCRIPTION OF THE DRAWINGS

FIGS. 2A and 2B are a top view and a back view, respectively, showing a second embodiment of the double eyelid forming device according to the present invention.

DETAILED DESCRIPTION OF THE INVENTION

Figure 1:
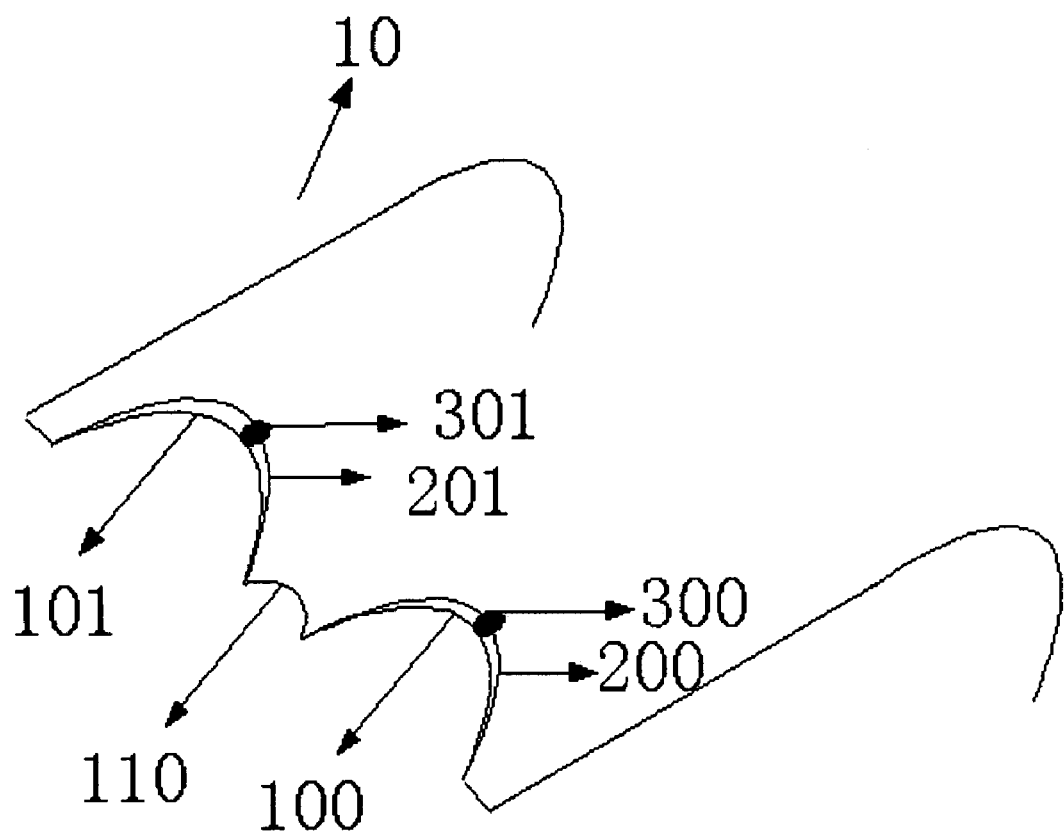
FIG. 1 is a schematic side view showing a first embodiment of the double eyelid forming device according to the present invention.

Referring to FIG. 1, a first embodiment of the device, 10, is shown in the shape of a set of regular eyeglasses. The lower rim and lens can be omitted for simplicity. The upper rim consists of the left rim 100 and the right rim 101 separated by the bridge 110. Two strings, 200 and 201, running along the curvature of the upper rim, are attached to the left rim, 100, and the right rim, 101, respectively, on the side of the glasses facing the wearer's eyes. The two ends of the strings are fixed to the rim and the portion of the strings between the two ends is detached from the rim. At least one bead, 300 and 301, having at least one through hole (not shown), is threaded onto each of the string and can slide along the string between the two ends. The beads rest on the upper rim along the whole sliding trajectory and protrude from the plane of the upper rim toward the wearer's upper eyelids.

When the eyeglasses of the first embodiment are worn by the user for creating double eyelids, the beads are pressed against the user's upper eyelids. The beads can generate point depressions in the upper eyelids in a short period. When the beads are moved by the user along the string, the point depressions can be joined and form a line of depression, essentially forming a crease in the upper eyelids. Repeated use can keep the crease in place for an extended period of time.

All the parts of the double eyelid generating eyeglasses can be manufactured using conventional materials. Preferred materials for forming the rim and temple of the glasses include plastics, metal and composite materials, although other materials with suitable characteristics, such as strength and rigidity, can be used. The string can be made of metal or plastics. The beads can be made of metal, ceramics, stones and other hard materials. The fixing means for holding both ends of the strings on the rim can include any conventional methods, such as by the use of but not limited to adhesives, welding, clips, clamps, bolts/nuts and the like.

A second embodiment of the device is shown in FIGS. 2A and 2B. FIG. 2A shows a top view of the device 12, in the shape of a set of regular eyeglasses with the lower rim and lens omitted for simplicity. FIG. 2B shows a back view of the device 12, viewed along the direction 2-2 in the eyes of the wearer. The upper rim consists of the left rim 102 and the right rim 103 separated by the bridge 112. It can be appreciated from the drawings that both rims have a curvature that conforms to the contour of the wearer's upper eyelid. A surface 400 of the upper rims is semi-horizontal except for the curvature. Two rigid wires, 202 and 203, positioned over the surface 401 which faces the wearer and running along the same curvature/contour, are attached to the left rim, 102, and the right rim, 103, respectively. The two ends of the wires are fixed to the rim and the portion of the strings between the two ends is detached from the rim. As shown in FIG. 2A, the ends of the wires which are adjacent to the bridge 112 are bent and held inside the rim (see the bent portions 382 and 383), and the other ends of the wires are also bent (see the bent portions 372 and 373) and connected to the legs (352 and 353) of the glasses. Of course, this is only one of the many possible ways of fixing the wires onto the glasses. Other fixing means can be used so long as they provide the required rigidity, durability and ease of manufacturing. At least two beads on each rim, represented by 302 and 303 respectively, are threaded onto each of the wires and can slide along the wire between the two ends. The beads rest on the upper rim along the whole sliding trajectory which conforms to the contour of the wearer's upper eyelid and protrude from the plane of the upper rim toward the wearer's upper eyelids.

A third embodiment of the device is in the form of fully functional eyeglasses, complete with lens and other parts. The strings and beads are attached to the upper rim of fully functional eyeglasses. The wearer can create the desired crease in the upper eyelids when the glasses are worn for daily activities, so long as the beads are positioned and pressed against the upper eyelids of the wearer.

A fourth embodiment of the device is in the form of a kit comprising two strings, at least two beads that can be threaded onto the strings and fixing means at both ends of the strings. When the device is used, at least one bead is threaded into each of the two strings, and the two strings are attached to the upper rim of a set of eyeglasses on the side of the glasses facing the wearer's face. Fixing means, in the form of adhesives, clips, clamps and the like, are used to keep the strings in place along the rim.

I claim:

1. A double eyelid forming device for non-surgically generating a crease in the upper eyelids of a human comprising,
   a left upper rim;
   a right upper rim;
   a bridge, said bridge connecting said left upper rim and said right upper rim;
   a left leg connected to said left upper rim;
   a right leg connected to said right upper rim;
   a first string having both ends thereof attached to, and running along the curvature of, said left upper rim;
   a second string having both ends thereof attached to, and running along the curvature of, said right upper rim;
   a first set of beads comprising at least one bead, said first set of beads slidably threaded onto said first string; and
   a second set of beads comprising at least one bead, said second set of beads slidably threaded onto said second string,
   wherein when the said device is worn by said human, said first set of beads press against the left upper eyelid of said human and said second set of beads press against the right upper eyelid of said human.

2. A double eyelid forming device according to claim 1 further comprising,
   a left lens attached to said left upper rim; and
   a right lens attached to said right upper rim.

3. A double eyelid forming device according to claim 2 further comprising a left lower rim and a right lower rim.

4. A method of generating a crease in the upper eyelids of a human, comprising the steps of,
   wearing said double eyelid forming device according to claim 1;
   adjusting the position of said first set of beads along said first string; and
   adjusting the position of said second set of beads along said second string;
   wherein said first set of beads and said second set of beads press against the upper eyelids of said human.

5. A double eyelid forming device for non-surgically generating a crease in the upper eyelids of a human comprising,
   a left upper rim having a first curvature that matches the contour of the left upper eyelid of said human when wearing said device;
   a right upper rim having a second curvature that matches the contour of the right upper eyelid of said human when wearing said device;
   a bridge, said bridge connecting said left upper rim and said right upper rim;
   a left leg connected to said left upper rim;
   a right leg connected to said right upper rim;
   a first rigid wire having both ends thereof attached to, and running along said first curvature of, said left upper rim;
   a second rigid wire having both ends thereof attached to, and running along said second curvature of, said right upper rim;
   a first set of beads comprising at least two beads, said first set of beads slidably threaded onto said first rigid wire; and
   a second set of beads comprising at least two beads, said second set of beads slidably threaded onto said second rigid wire,
   wherein when the said device is worn by said human, said first set of beads press against the left upper eyelid of said human and said second set of beads press against the right upper eyelid of said human.

6. A double eyelid forming device according to claim 5 further comprising,
   a left lens attached to said left upper rim; and
   a right lens attached to said right upper rim.

7. A double eyelid forming device according to claim 6 further comprising a left lower rim and a right lower rim.

8. A method of generating a crease in the upper eyelids of a human, comprising the steps of,
   wearing said double eyelid forming device according to claim 5;
   adjusting the position of said first set of beads along said first string; and
   adjusting the position of said second set of beads along said second string;
   wherein said first set of beads and said second set of beads press against the upper eyelids of said human.

9. A kit for attaching to and converting a set of eyeglasses having a left upper rim and a right upper rim into a device for non-surgically generating a crease in the upper eyelids of a human when said device is worn by said human, comprising,
   a first string having a first pair of ends;
   a second string having a second pair of ends;
   a first set of beads comprising at least one bead having a through hole for threading onto said first string;
   a second set of beads comprising at least one bead having a through hole for threading onto said second string;
   fixing means for attaching said first pair of ends of said first string having said first set of beads threaded thereon to the left upper rim of said set of eyeglasses and for attaching said second pair of ends of said second string having said second set of beads threaded thereon to the right upper rim of said set of eyeglasses when said device is to be worn by said human;
   wherein when the said device is worn by said human, said first set of beads press against the left upper eyelid of said human and said second set of beads press against the right upper eyelid of said human.

10. A method of generating a crease in the upper eyelids of a human using a kit according to claim 9, comprising the steps of,
    obtaining a set of glasses comprising a left upper rim and a right upper rim;
    threading said first set of beads onto said first string;
    threading said second set of beads onto said second string;
    fixing said first string to said left upper rim using said fixing means;
    fixing said second string to said right upper rim using said fixing means;
    wearing said set of eyeglasses;
    adjusting the position of said first set of beads along said first string; and
    adjusting the position of said second set of beads along said second string;
    wherein said first set of beads and said second set of beads press against the upper eyelids of said human.

* * * * *